United States Patent
Mitrakas et al.

(10) Patent No.: US 11,427,481 B2
(45) Date of Patent: Aug. 30, 2022

(54) METHOD FOR THE SYNTHESIS OF NEGATIVELY CHARGED MANGANESE FEROXYHYTE FOR THE SELECTIVE REMOVAL OF MERCURY FROM WATER

(71) Applicant: Innovative Filter Media Technology Private Capital Company, Salonika (GR)

(72) Inventors: Manassis Mitrakas, Salonika (GR); Georgios Stavropoulos, Salonika (GR); Evgenios Kokkinos, Salonika (GR); Ioannis Kellartzis, Salonika (GR); Konstantinos Symeonidis, Salonika (GR); Christos Koukiotis, Salonika (GR)

(73) Assignee: Innovative Filter Media Technology Private Capital Company, Salonika (GR)

( * ) Notice: Subject to any disclaimer, the term of this patent is extended or adjusted under 35 U.S.C. 154(b) by 818 days.

(21) Appl. No.: 16/316,550

(22) PCT Filed: Jul. 12, 2017

(86) PCT No.: PCT/GR2017/000041
§ 371 (c)(1),
(2) Date: Jan. 9, 2019

(87) PCT Pub. No.: WO2018/011609
PCT Pub. Date: Jan. 18, 2018

(65) Prior Publication Data
US 2021/0188658 A1 Jun. 24, 2021

(30) Foreign Application Priority Data
Jul. 13, 2016 (GR) ................ 20160100378

(51) Int. Cl.
C01G 49/00 (2006.01)
B01J 20/06 (2006.01)
B01J 20/28 (2006.01)
C02F 1/28 (2006.01)
C02F 101/20 (2006.01)

(52) U.S. Cl.
CPC .......... *C01G 49/0072* (2013.01); *B01J 20/06* (2013.01); *B01J 20/28061* (2013.01); *C02F 1/281* (2013.01); *C01P 2004/61* (2013.01); *C01P 2006/12* (2013.01); *C01P 2006/40* (2013.01); *C02F 2101/206* (2013.01); *C02F 2209/02* (2013.01); *C02F 2209/06* (2013.01)

(58) Field of Classification Search
CPC . C01G 49/0072; B01J 20/06; B01J 20/28061; C02F 1/281
See application file for complete search history.

(56) References Cited

U.S. PATENT DOCUMENTS

| | | | |
|---|---|---|---|
| 8,263,525 B1 | 9/2012 | Skandan et al. | |
| 9,011,694 B2 * | 4/2015 | Mitrakas | C01G 45/006 |
| | | | 210/688 |
| 2013/0089479 A1 | 4/2013 | Ergang et al. | |
| 2013/0152788 A1 | 6/2013 | Turbeville et al. | |

FOREIGN PATENT DOCUMENTS

| | | |
|---|---|---|
| CN | 102432085 A | 5/2012 |
| CN | 102872913 A | 1/2013 |
| CN | 102908992 A | 2/2013 |
| WO | 2012/042282 A1 | 4/2012 |

OTHER PUBLICATIONS

Atwood et al., "Mercury removal from water," *Recent Developments in Mercury Science, (Structure and Bonding,* v. 120) Springer: Berlin, Heidelberg, 120: 163-182 (2006).

Granite et al., "Sorbents for mercury capture from fuel gas with application to gasification systems," *Industrial & Engineering Chemistry Research,* 45(13): 4844-4848 (2006).

Jadhav et al., "Development and Evaluation of Nanoscale Sorbents for Mercury Capture from Warm Fuel Gas: Preliminary Sorbent Evaluation (Task 3)," Gas Technology Institute: Des Plaines, IL, 12 pp. (Oct. 2005).

Li et al., "Removal of elemental mercury from simulated coal-combustion flue gas using a $SiO_2$—$TiO_2$ nanocomposite," *Fuel Processing Technology,* 89: 567-573 (2008).

Li et al., "Oxidation and capture of elemental mercury over $SiO_2$—$TiO_2$—$V_2O_5$ catalysts in simulated low-rank coal combustion flue gas," *Chemical Engineering J.,* 169(1-3): 186-193 (2011).

Li et al., "Superior activity of $MnO_x$—$CeO_2$/$TiO_2$ catalyst for catalytic oxidation of elemental mercury at low flue gas temperatures," *Applied Catalysis B: Environmental,* 111-112: 381-388 (2012).

Scala et al., "Characterization of a regenerable sorbent for high temperature elemental mercury capture from flue gas," *Fuel,* 108: 13-18 (Jun. 2013).

(Continued)

*Primary Examiner* — Yong L Chu
(74) *Attorney, Agent, or Firm* — Leydig, Voit & Mayer, Ltd.

(57) ABSTRACT

The present invention refers to the method for synthesis an absorbent material consisting of a phase of tetravalent manganese feroxyhyte ($\delta$-$Fe_{(1-x)}Mn_xOOH$) with a negatively charged grain surface in which a percentage of iron has been isomorphically substituted by manganese atoms at 0.05-25%. Its' production is carried out in two continuous flow stirred-tank reactors arranged in serial configuration, where mild acidic conditions (pH 5-6) prevail in the first reactor and mild alkaline conditions (pH 9-10) together with high redox potential (600-700 mV) in the second reactor. The material can be used to uptake mercury, as well as other heavy metals from both water and hot gas streams. Specifically, the adsorption capacity is determined by the magnitude of the negative surface charge and the isoelectric point that can be both adjusted by the synthesis process parameters.

8 Claims, 4 Drawing Sheets

(56) References Cited

OTHER PUBLICATIONS

Tan et al., "Preparation and characterization of $Fe_2O_3$—$SiO_2$ composite and its effect on elemental mercury removal," *Chemical Engineering Journal*, 195: 218-225 (2012).

Tresintsi et al., "Tetravalent manganese feroxyhyte: a novel nanoadsorbent equally selective for As(III) and As(V) removal from drinking water," *Environmental Science & Technology*, 47(17): 9699-9705 (2013).

Wan et al., "Removal of gaseous elemental mercury over a CeO2—WO3/TiO2 nanocomposite in simulated coal-fired flue gas," *Chemical Engineering J.*, 170(2-3): 512-517 (2011).

Wiatros-Motyka et al., "High capacity co-precipitated manganese oxides sorbents for oxidative mercury capture," *Fuel*, 109: 559-562 (Jul. 2013).

Wu et al., "Characteristics of the removal of mercury vapor in coal derived fuel gas over iron oxide sorbents," *Fuel*, 85(2): 213-218 (2006).

Yang et al., "Capture of gaseous elemental mercury from flue gas using a magnetic and sulfur poisoning resistant sorbent Mn/$\gamma$-$Fe_2O_3$ at lower temperatures," *J. of Hazardous Materials*, 186: 508-515 (2011).

Yang et al., "Gaseous elemental mercury capture from flue gas using magnetic nanosized $(Fe_{3-x}Mn_x)_{1-\delta}O_4$," *Environmental Science & Technology*, 45(4): 1540-1546 (2011).

Yang et al., "Nanosized Cation-Deficient Fe—Ti Spinel: A Novel Magnetic Sorbent for Elemental Mercury Capture from Flue Gas," *ACS Applied Materials & Interfaces*, 3: 209 (2011).

Zheng et al., "Review of technologies for mercury removal from flue gas from cement production processes," *Progress in Energy and Combustion Science*, 38(5): 599-629 (2012).

\* cited by examiner

METHOD FOR THE SYNTHESIS OF NEGATIVELY CHARGED MANGANESE FEROXYHYTE FOR THE SELECTIVE REMOVAL OF MERCURY FROM WATER

CROSS-REFERENCE TO RELATED APPLICATIONS

This patent application is a U.S. national phase application of copending International Patent Application No. PCT/GR2017/000041, filed Jul. 12, 2017, and claims the benefit of Greece Patent Application No. 20160100378, filed Jul. 13, 2016, each disclosure of which is incorporated herein by reference in its entirety.

FIELD OF THE DISCLOSURE

The invention belongs to the field of chemical engineering and in particular to water purification technology by means of solid adsorbents. Solid adsorbents are used in the current state of the art as filling media in a column bed for removing by adsorption heavy metal cations and in particular mercury from potable and waste water.

BACKGROUND OF THE INVENTION

Mercury pollution is considered as one of the most important environmental issues due to its mobility in the various stages of life cycle and its confirmed high toxicity. Exposure to mercury may be particularly harmful depending on the dose taken, the chemical form of mercury, the synergistic effect with other toxic agents and the state of human health. In particular, the main effects observed are chronic poisoning, various reproductive, genetic, neurological and psychiatric problems, as well as side effects in kidneys, blood, urine and limbs. Based on human health concerns about mercury uptake from drinking water, the World Health Organization has already proposed from 1971 and since has been gradually applied worldwide, a concentration of 0.001 mg/L of total mercury, as drinking regulation limit.

The presence of mercury in air, water and soil is related to both natural and anthropogenic processes and activities. In particular, natural processes include the leaching of rocks with minerals containing mercury and air emissions through volcanic or geothermal activity. The main anthropogenic emissions come from fossil fuel combustion, metallurgy, gold mining, waste incineration, as well as from the production of cement, caustic soda, paper and paint. Depending on the acidity, redox potential and concentration of other anions, mercury can be found as bivalent in natural waters and in three forms: $Hg^{2+}$, $HgOH^+$ and $Hg(OH)_2$. However, at the usual pH values of 6-8 the dominant form is $Hg(OH)_2$.

Mercury removal and capture processes can be classified in those aimed at water purification (mainly wastewater) which focus on ionic forms of mercury and those applied for gas phase purification which usually focus on the volatile metallic form) ($Hg^0$). A series of methods for mercury removal such as phyto-absorption, bio-adsorption, artificial wetlands and sedimentation cannot be applied to water intended for human consumption due to the inability to process large flow rates and mainly due to the large volume of toxic wastewater, even though they exhibit acceptable fixed and operating costs. For obvious reasons they cannot be used to remove mercury from flue gases. The use of ion-exchange resins, alumina membranes, polymeric fibers and air stripping exhibit greater efficiency in mercury removal. However, they fall short in terms of operating costs and their inability to process large volumes of water. A wide variety of mercury capture methods has also been used for its removal from gaseous streams and in particular from flue gases. Among these methods are the use of electrostatic or conventional filters, which together with the separation of particulate matter they also remove a percentage of mercury. Catalytic oxidation and the addition of amalgamation reagents, as well as adsorbents spraying, are synergistically used in order to capture mercury and are then separated into electrostatic filters.

However, the most widespread mercury removal technology, both from gas and aqueous streams, is the application of adsorbent materials and mainly activated carbons. The effectiveness of the activated carbons is mainly based on their large specific surface area, whereas the fact that they retain mercury with weak bonds, suggests that they do not have a suitable surface charge density and significant oxidation capacity of elemental mercury, increasing therefore the possibility of future leaching. In addition, the efficiency of activated carbon is considered insufficient on the basis of complying with the new environmental guidelines for both drinking water, where the regulation limit is 1 μg Hg/L, and flue gases where the emission limit is 50 μg $Hg/m^3$.

As a result, in recent years, research has focused on the development of adsorbents based on simple or composite inorganic materials. However, the overwhelming majority of inorganic mercury removal adsorbents are applied to flue gases, and it is often noted that their performance is significantly reduced when applied to water treatment, since water molecules contribute to the reduction of active sites. These cases can be separated:

- in composite materials of two or more phases which act successively in the oxidation stage of the mercury and at its capture stage; and
- in single-phase materials where retention and possible oxidation of mercury takes place on the surface of the same material.

The first approach is reported by S. Yang et al., Journal of Hazardous Materials 186 (2011) 508, where a composite material of manganese/maghemite (Mn/γ-$Fe_2O_3$) was used to oxidize mercury from a gas stream and then to its retention either from manganese or maghemite. The ability to retain the oxidized form results from its negative surface load. The maximum capacity is 3.54 mg/g, which it is reduced to 0.52 mg/g when the permitted limit of Hg (50 μg/$m^3$) is reached in the outgoing stream (300° C.).

Sand with adsorbed manganese appears to perform well for water purification from heavy metal as shown in D. A. Atwood and M. K. Zaman, Structure and Bonding, Vol. 120, Springer-Verlag, 163. However, with the pass of fresh water, leaching of the adsorbed mercury is observed.

A similar case is the binary oxide of manganese/zirconium ($MnO_x$/$ZrO_2$) described in M. M. Wiatros-Motyka et al., Fuel 109 (2013) 559. This material exploits the oxidative capacity of manganese oxide, while the role of zirconium oxide is not elucidated by the authors, but it is likely to provide additional physisorption sites. The data given on the material capacity do not correspond to actual application conditions since the maximum adsorption capacity determined (8.4 mg/g) corresponds to the excessively high effluent concentration of 3000 mg Hg/$m^3$.

The combination of manganese oxide with alumina ($MnO_x$/$Al_2O_3$) is reported in publication of F. Scala et al., Fuel 108 (2013) 13 and R. A. Jadhav et al., Topical review for U.S. Department of Energy (2005) for the cleaning of hot air from mercury. In the first case, the yield reported for a effluent concentration of around 0.1 mg Hg/m$^3$ is 3.7 mg/g at 200° C., while desorption of mercury is observed at higher temperatures. Therefore, the material is unable to reach the limit of gaseous emissions, while the absorption power is very weak. In contrast, the second article gives evidence confirming the ability to reduce the mercury concentration in the effluent stream below 50 μg/m$^3$ when the temperature is 100° C. The adsorption capacity is relatively low (0.15 mg/g) and decreases rapidly when the temperature rises to 200° C.

A series of binary titanium-oxide based materials (TiO$_2$) was used in the publications of Y. Li et al., Fuel Processing Technology 89 (2008) 567 (SiO$_2$/TiO$_2$), H. Li et al. 2011) 186 and Applied Catalysis B: Environmental 111-112 (2012) 381 (SiO$_2$/TiO$_2$/V$_2$O$_5$ and MnO$_x$—CeO$_2$/TiO$_2$), Q. Wan et al., Chemical Engineering Journal 170 (2011) TiO$_2$) and S. Wu et al., Fuel 85 (2006) 213 (Fe$_2$O$_3$/TiO$_2$), trying to exploit its catalytic effect on mercury oxidation. However, it is found that in these cases it is necessary to activate the surface of the titanium oxide with ultraviolet radiation together with the co-existence of hydrogen sulphide or hydrochloric acid in the gas stream for the stabilization of the oxidized mercury. Due to these limitations, the process presents significant interferences from other components of the gas stream. In addition, in all cases, although the materials were able to reduce the mercury concentration below the emission limit, the data given on the efficient operation and mercury capacity are incomplete as they refer to a large amount of material and contact times of the gas stream.

The use of iron oxide (Fe$_2$O$_3$) as an active component is described in the publication of Z. Tan et al., Chemical Engineering Journal 195-196 (2012) 218 in a binary material with silicon oxide (SiO$_2$), which presents a relatively low yield (85%) in the adsorption of mercury from a gas stream. In this case the oxidation is assisted by the presence of oxygen.

Magnetic ferrite nanoparticles, as a material for water purification from mercury, are proposed in CN 102908992, CN 102872913 and CN 102432085. Nanoparticies are either covered by active mercury adsorption groups (rhodamine, starch) or are incorporated with palladium nanoparticles into carbon nanotubes. In addition to the high cost and incompatibility of rhodamine and starch with potable water, these materials exhibit close to zero mercury uptake efficiency.

A big part of the effort is aimed at upgrading the performance of activated carbon either by incorporating inorganic dopants (MnO$_2$, ZnCl$_2$, FeCl$_3$, CuCl$_2$) or by activating their surface by oxidation with ozone, hydrogen peroxide, nitric acid and potassium permanganate as reported in the publication of Y. Zheng et al., Progress in Energy and Combustion Science 38 (2012) 599. These materials, even though they multiply the mercury removal capacity of the respective activated carbon, they exhibit a capacity not exceeding 1 mg Hg/g for the effluent concentration of 50 μg Hg/m$^3$.

Document U.S. Pat. No. 8,263,525 B1 discloses a solid carbon nanoparticle substrate and a sequential silicon oxide and sulfide functional coating, which has a significantly higher yield of mercury removal from water compared to corresponding commercial products. The data reported show that the material reaches saturation after 2 hours of water treatment with a concentration of 100 mg/L of mercury. Although the capacity of the material up to saturation is relatively high (50 mg/g), it can be easily concluded that it cannot be applied to potable water where the effluent concentration should be below 1 μg/L.

The second approach involves the use of metals such as Ir, Pt, Pd, Rh, Ti and Ru described in the publication of E. J. Granite et al., Industrial and Engineering Chemistry Research 45 (2006) 4844. These materials, which have the ability to form amalgams with mercury, have been experimentally tested for mercury binding from a hot air stream. The results showed that the yield of Pt reached 100%, Ir was 93% and for the rest did not exceed 65%, while the corresponding adsorption capacities were less than 0.5 mg/g. If the cost of these noble materials is taken into account, their application on a large scale is prohibited.

A series of metal sulphide compounds (e.g., CuS), which prepared by precipitation of corresponding precursors and an inorganic or organic source of sulphur and used to remove mercury from gasses or liquids, are disclosed in US 20130152788 A1. These materials have a low production cost, however, from measurements provided only for gas adsorption the material capacity corresponds to high effluent concentrations (150-200 μg/m$^3$).

Document US 20130089479 A1 discloses the synthesis of sulphide-based inorganic oxides based on silicon oxide of the general form of (SiO$_2$)$_x$(OH)$_y$M$_z$S$_a$FB, where M is a metalloid cation, S is a sulphide salt, F is an organosilane and B is a hygroscopic alkali oxide or hydroxide. These complex compounds are used to counteract mercury with the use of the sulphide groups, while at the same time capturing the remaining inhibitory compounds encountered in the flue gases with the use of the other components. Both the cost of the raw materials and the synthesis process is expected to be quite high, and even the evaluation does not show a high mercury removal capacity.

Single-phase materials with relatively high surface cation density have proven to be quite efficient in the adsorption of mercury from gases. Manganese ferrite (Fe$_{3-x}$Mn$_x$O$_4$) and non-stoichiometric titanium-magnetite (Fe$_{3-x}$Ti$_x$O$_4$) have been studied by S. Yang et al., Environmental Science and Technology 45 (2011) 1540 and S. Yang et al., Applied Materials and Interfaces 3 (2011) 209 in which oxidation of mercury from Ti and Mn$^{4+}$, respectively, was verified and then mercury was adsorbed on the surface of the material. These materials are prepared by co-precipitation from iron and manganese or titanium salts. The maximum adsorption capacity reaches 4.0 and 5.1 mg/g, respectively, in a gas stream at a temperature of 250° C. However, when the mercury effluent concentration is less than 0.05 mg/m$^3$, the effective capacity is less than 0.2 mg/m$^3$.

The inorganic adsorbents described in the aforementioned publications as mercury removal materials have the following disadvantages:
  Practically, there is no material aimed for purifying potable water from mercury. In addition, there is no evidence for the effectiveness of developed inorganic adsorbents at mercury removal from hot gaseous streams.
  Namely, their synthesis processes are of high cost as they are in a batch operation for long contact time and often under prolonged heating. In addition, some of the materials used are of high value.
  Despite the reported high mercury uptake capacities, these yields are not meet the drinking water and gas emission legislative limitations.
  The low efficiency is due to the fact that the composition is not designed in such a way that the surface of the material to exhibit an increased negatively surface charge density, which is necessary for the irreversible adsorption of positively charged Hg$^{2+}$ ions found in water.

Similarly, oxidation capacity is not optimized, resulting in the partial adsorption of mercury by physisorption in the form of $Hg^0$, which reduces the yield and allows for subsequent mercury leaching.

The data provided indicate that with the use of these materials a possible gradual leach of mercury to the environment is expected, while the corresponding leaching tests are not usually reported.

Therefore, the development of a mercury-adsorbent with low production cost, a high oxidation capacity of elemental mercury and, above all, a high negatively surface charge density would be the ideal solution for mercury removal for both drinking water and gaseous streams at concentrations below the drinking water regulation limit (1 μg/L), as well as the emission limit (50 μg/m$^3$), respectively, using an adsorption bed.

Several of these characteristics are presented in the manganese tetravalent feroxyhyte described in WO/2012/042282 and in publication S. Tresintsi et al., Environmental Science and Technology 47 (2013) 9699 for the removal of arsenic and other heavy metals as well as mercury from drinking water. This material consists of iron oxy-hydroxide with tetravalent manganese, which gives its high oxidation potential, while being prepared in a continuous and ambient temperature arrangement from low-cost precursor-materials such as $FeSO_4$ and $KMnO_4$. However, its' synthesis in an aqueous solution is carried out under acidic conditions (pH 4-7) resulting in a high positive surface charge density as determined by the value of the isoelectric point that exceeds the value of 7. This condition, although it maximizes the removal efficiency of the negatively charged arsenic oxyanions, limits both the approach and the binding of the positively charged mercury cations due to electrostatic repulsion.

BRIEF SUMMARY OF THE DISCLOSURE

The present invention is based on a new approach to the synthesis process of the tetravalent manganese feroxyhyte ($Fe_{1-x}Mn_xOOH$, where $0.05 < x < 0.25$) that has as the main feature the negatively charged surface (isoelectric point less than 5.5) and high mercury removal efficiency from water, while maintaining oxidative capacity and low production cost. For this purpose, production takes place in a two-stage continuous flow reactor under alkaline conditions (pH 7-12) and strong oxidizing conditions.

The present invention solves the above problems as follows:

The material has a very high capture capacity of mercury from water, while at the same time being able to decrease residual concentration after treatment below the regulation limit of 1 μg/L.

It is synthesized in a continuous-flow reactor with high production capacity from low-cost raw materials at ambient temperature. Synthesis under alkaline conditions affects negligibly the cost due to increase the amount of base solution added, compared to the corresponding material of WO/2012/042282.

Its production at alkaline environment (at increased $OH^-$ concentration) ensures a high negatively surface charge density, leading to high adsorption capacity of positively charged forms of mercury that predominate in water.

The oxidative potential due to the presence of tetravalent manganese favors the complete oxidation of elemental mercury in the flue gases, as well as in the natural gas at the mining site, and its capture as $Hg^{2+}$. In this way the maximum removal efficiency per unit weight of adsorbent is achieved, while at the same time the phenomenon is irreversible and mercury leaching into the environment is virtual impossible.

BRIEF DESCRIPTION OF THE SEVERAL VIEWS OF THE DRAWINGS

The present invention can be fully understood from the detailed description of the synthesis method, figures and examples of application of the method of synthesis of absorbent material that follows.

The enclosed drawings describe.

Figure 3:
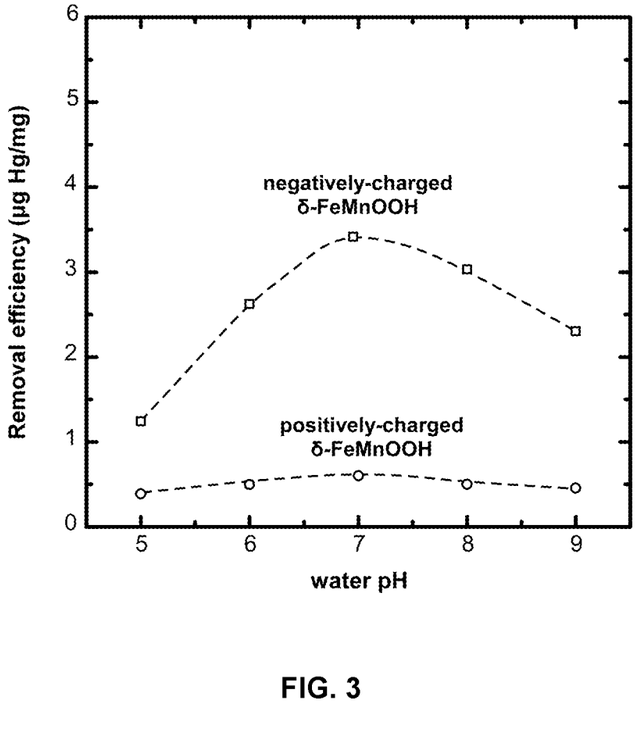
FIG. 3 is a correlation diagram of the adsorption capacity, when residual concentration at the limit of 1 μg/L is achieved, of the negatively charged $\delta$-$Fe_{0.75}Mn_{0.25}OOH$ (final synthesis pH 9) for mercury in water with different pH values (5-9) compared to the material prepared entirely in acidic environment (pH 4).

The correlation diagram of the adsorption capacity, when residual concentration at the limit of 1 μg/L is achieved, of the negatively charged $\delta$-$Fe_{0.75}Mn_{0.25}OOH$ (final composition pH 9) for mercury in water with different pH values (5-9) compared to the material prepared entirely in acidic environment (pH 4) is shown in FIG. 3.

Figure 4:
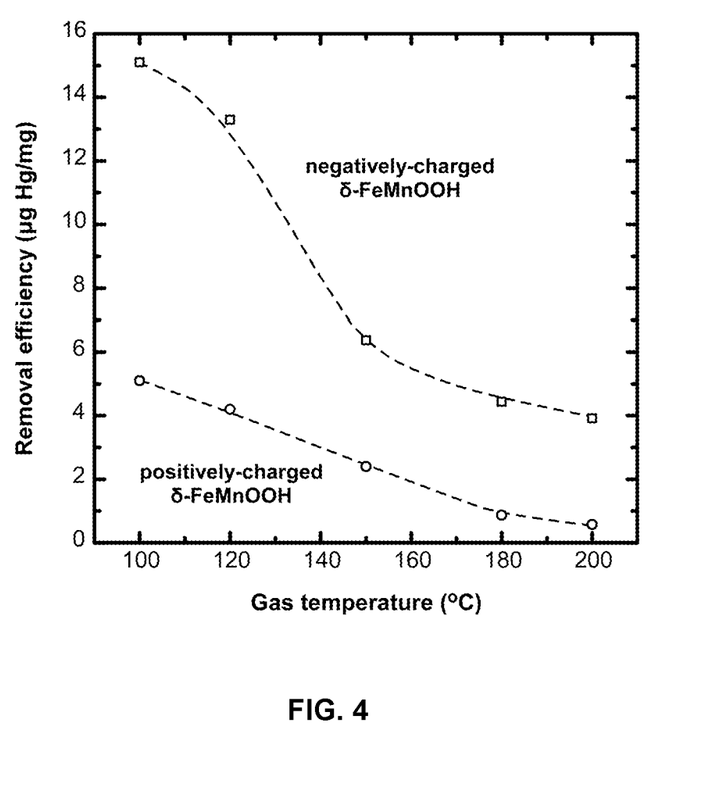
FIG. 4 is a correlation diagram of the $Hg^0$ adsorption capacity of the negatively charged $\delta$-$Fe_{0.75}Mn_{0.25}OOH$ (final synthesis pH 9) for a residual concentration equal to the limit of 50 μg/m$^3$ as a function of the gas stream temperature compared to the material prepared entirely in acidic environment (pH 4).

The correlation diagram of the $Hg^0$ adsorption capacity of the negatively charged $\delta$-$Fe_{0.75}Mn_{0.25}OOH$ (final composition pH 9) for a residual concentration equal to the limit of 50 μg/m$^3$ as a function of the gas stream temperature compared to the material prepared entirely in acidic environment (pH 4) is shown in FIG. 4.

DETAILED DESCRIPTION

The purpose of the present invention is to produce a tetravalent manganese feroxyhyte material [$Fe_{(1-x)}Mn_xOOH$, where $0.05 < x < 0.25$] with an isoelectric point of less than 5.5 and a high negatively surface charge density (1.5 mmol $H^+$/g), which results in high mercury adsorption capacity from water, as well as in high adsorption capacity of other heavy metals with valence ≥+2. This objective was achieved by a reaction of Fe(II) and Mn(VII) salts in a two-stage continuous flow reactors where the following reactions take place:

In the first reactor, the Fe (II) salts are precipitated with $KMnO_4$ in a weakly acidic to neutral environment for the production of the tetravalent manganese feroxyhyte. The pH is adjusted to a constant value of 5-6 by adding a solution of one of the reagents NaOH, $NaHCO_3$, $Na_2CO_3$, KOH, $KHCO_3$, $K_2CO_3$, while the high redox potential is set to a constant value of 500±50 mV by adding $KMnO_4$. The reaction time in the first reactor does not exceed 20 min, which allows the formation of nucleated manganese feroxyhyte, but not the full development of the positive surface structure.

In the second reactor, the pH is increased with the addition of either NaOH or KOH in the range between 9 and 10, while the redox potential is maintained in the 650±50 mV range with the addition of $KMnO_4$, so that the increase of the tetravalent manganese feroxyhyte crystals in a high both pH and redox potential environment, will lead to the increase of the negative surface charge, which is necessary for the uptake of the positively charged ions, such as mercury and other heavy metals.

It is then followed by the aging process which takes place in stirring tank.

More specifically, the synthesis method of the tetravalent manganese feroxyhyte adsorbent with the high negative charge in the pH range of natural waters, corresponding to an isoelectric point lower than 5.5, is performed as follows:

Two continuous flow stirred-tank reactors arranged in serial configuration are used. The retention time in the first reactor does not exceed 20 min (FIG. 1), while in the second reactor is at least 2 hours. The amount of product produced is a function of the iron and manganese reagents flow $Q_1$, $Q_2$ to the first reactor and $Q_3$, $Q_4$ to the second reactor, respectively. The $Q_3$ and $Q_4$ flows can be 0 to 5 times greater than $Q_1$ and $Q_2$, respectively.

Figure 1:
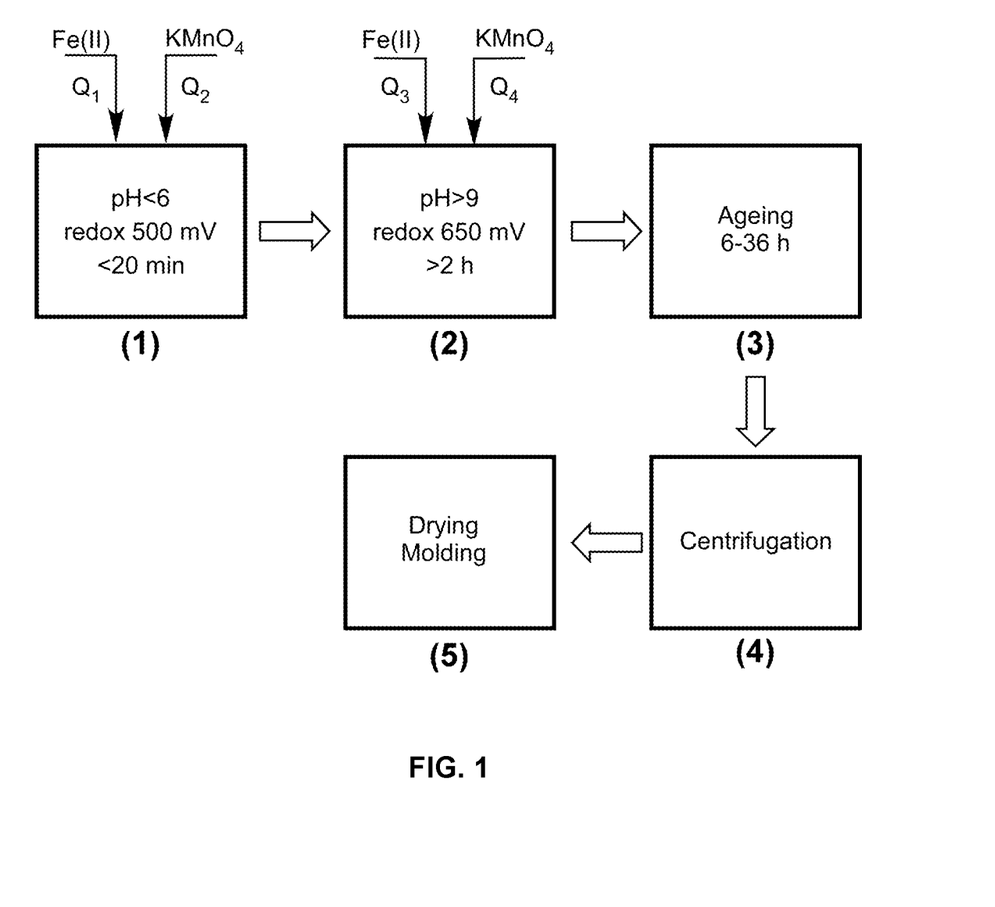
FIG. 1 is a flow diagram of the synthesis process of the adsorbent material according to the described method.
Figure 2:
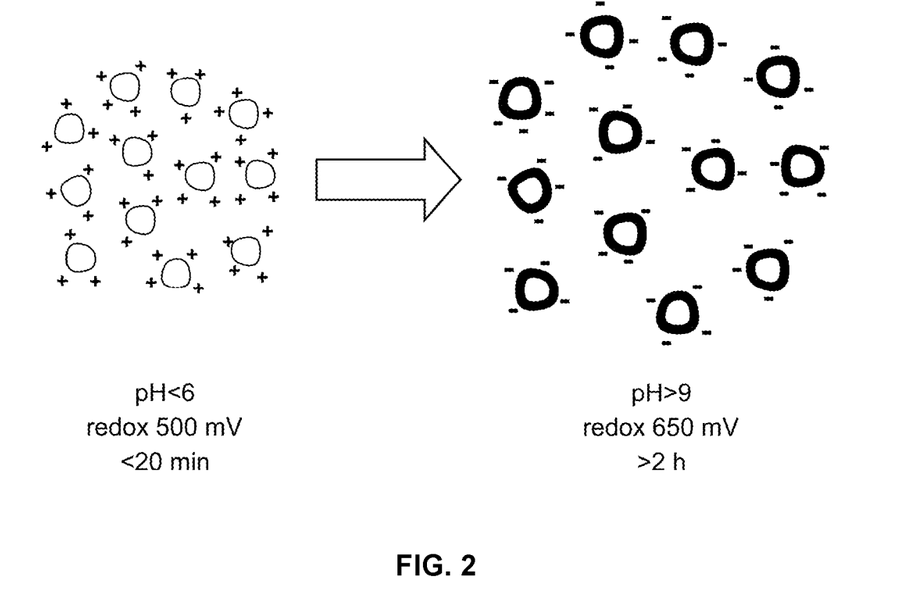
FIG. 2 is a schematic representation of the grain growth mechanism of the material during the two reaction steps.

In the reactor (1) an aqueous solution of $FeSO_4$ or $FeCl_2$ of 1-50 g/L concentration and a $KMnO_4$ aqueous solution of 1-20 g/L concentration are simultaneously introduced in continuous flow. The regulation of the flow rate ratio of the Fe (II) and $KMnO_4$ solutions is controlled by achieving the desired redox potential of 500±50 mV, which is necessary for the nuclei formation of the $Fe_{(1-x)}Mn_xOOH$ type with the percentage content in Mn(IV) ranging at 12±1 wt %. The reaction product enters the reactor (2), and a new $FeSO_4$ or $FeCl_2$ solution of 1-50 g/L concentration and a $KMnO_4$ solution of 1-20 g/L concentration are added. The regulation of the flow ratio of the Fe (II) and $KMnO_4$ solutions is controlled by maintaining the desired redox potential of 650±50 mV in the reactor (2). In both reactors (1) and (2), the pH value is adjusted throughout the reaction in the range of 5-6 in the first reactor and in the range of 9-10 in the second one by adding a solution of one or a combination of more than one of the alkaline reagents NaOH, $Na_2CO_3$, KOH, and $K_2CO_3$.

The effluent from the (2) is kept in a thickening tank (3) with a gentle stirring for a period of 6-36 hours where maximization and balancing of the negative surface charge is achieved. Under these conditions aging of the granules leads to the formation of amorphous nanocrystals without favoring their agglomeration in secondary morphologies as observed under acidic aging conditions.

The precipitate after thickening is dehydrated by centrifugation (4) and is either molded into 250-2500 μm size granules and dried or first dried and then milled to a grain size of less than 50 μm (5).

The adsorbent material can be used to uptake mercury from water, as well as other heavy metals such as cadmium, lead, nickel, cobalt, vanadium, copper, manganese and iron, preferably in an adsorption bed configuration. Its use is intended for drinking water treatment plants for domestic, industrial and point of use implementation, for the treatment of industrial and municipal waste, as well as for the treatment of flue gases and natural gas.

From the procedure described above the tetravalent manganese feroxyhyte can be formed in the pH range of 3-12. However, at a pH of less than 8, its adsorption capacity for mercury and other heavy metals is dramatically reduced, since the positive surface charge, which repels the homonymous positively charged metal ions, gradually predominates.

In particular, the negatively charged solid tetravalent manganese feroxyhyte has a specific surface area of 200-300 $m^2$/g and a grain size of 250-2500 μm. Its maximum adsorption capacity ($q_{max}$) for water with a pH of 7-8 exceeds 80 μg Hg/mg at a temperature of 20° C. In addition, the elemental mercury removal rate up to saturation from a gas stream exceeds 50 μg Hg/mg.

The efficiency (parameter $q_1$) of the material to uptake mercury from natural waters at pH 6-8 and at the same time to achieve at a residual concentration equal to limit of 1 μg/L is obtained from the diagram of FIG. 3. The measurements refer to manganese feroxyhyte with a 25% substitution rate. In these experiments, the test water was prepared according to NSF protocol and its composition reaches the specifications of the majority of natural waters, since it contains all the parameters that inhibit mercury adsorption. In particular, it contains 88.8 mg/L $Na^+$, 40 mg/L $Ca^{2+}$, 12.7 mg/L $Mg^{2+}$, 183 mg/L $HCO_3^-$, 50 mg/L $SO_4^{2-}$, 71 mg/L $Cl^-$, 2 mg/L $N-NO_3^-$, 1 mg/L $F^-$, 0.04 mg/L $P-PO_4^{3-}$ and 20 mg/L $SiO_2$. The value of parameter $q_1$ for mercury removal from NSF water, at pH 7, at 20° C. was found to be 2.8 μg/mg. Accordingly, the specific adsorption capacity ($q_{50}$) for elemental mercury from a gas stream at 120° C. and at an equilibrium concentration of 50 μg/$m^3$, which is the emission limit, was 13.3 μg/mg for contact time of 0.1 s.

Example of Method Application 1

A solution of 45 g/L $FeSO_4$ $H_2O$ is fed at a flowrate of $Q_1$=2 $m^3$/h and mixed with a 15 g/L $KMnO_4$ solution of flowrate $Q_2$=2 $m^3$/h in the 1 $m^3$ volume stirred-reactor (1). The flowrate of $KMnO_4$ is varied so that the redox potential in the reactor (1) is maintained at the 500±50 mV range. The pH of the reaction is adjusted to 5.5±0.1 by the addition of 30% w/w NaOH solution.

The reaction product leaving the reactor (1) enters the 16 $m^3$ volume stirred-reactor (2), where a solution of 45 g/L $FeSO_4$ $H_2O$ at a flowrate of $Q_3$=2 $m^3$/h and a solution of 15 g/L $KMnO_4$ at a flowrate of $Q_4$=2 $m^3$/h are added. The redox potential in the reactor (2) is regulated in the 650±50 mV range by the addition of $KMnO_4$ and the pH is regulated at 9±0.1 by the addition of a 30% w/w NaOH solution. The product from the reactor (2) outflow is led to the thickening tank where it is kept under mild stirring for 24 hours, then is mechanically dehydrated by centrifuge or filter press, sized to 250-2500 μm and dried at 110° C. The resulting material has a $Fe_{0.75}Mn_{0.25}OOH$ structure and the manganese valence is 4. Its application to an adsorption column with contact time of 3 minutes gives an adsorption capacity of $Hg^{2+}$ 2.8 μg/mg in standard NSF water, pH 7 and an equilibrium concentration of 1 μg/L.

Example of Method Application 2

A solution of 15 g/L $FeSO_4$ $H_2O$ is fed at a flowrate of $Q_1$=3 $m^3$/h and mixed with a 15 g/L $KMnO_4$ solution of flowrate $Q_2$=1 $m^3$/h in the 1 $m^3$ volume stirred-reactor (1). The flowrate of $KMnO_4$ is varied so that the redox potential in the reactor (1) is maintained in the 500±50 mV range. The pH of the reaction is adjusted to 5.5±0.1 by adding a 5% w/w $K_2CO_3$ solution.

The reaction product leaving the reactor (1) enters the 32 $m^3$ volume stirred-reactor (2), where a solution of 15 g/L $FeSO_4$ $H_2O$ at a flowrate of $Q_3$=9 $m^3$/h and a solution of 15 g/L $KMnO_4$ at a flowrate of $Q_4$=3 $m^3$/h are added. The redox potential in the reactor (2) is regulated in the 650±50 mV range by adding $KMnO_4$ and the pH is regulated at 9±0.1 by adding a 10% w/w KOH solution. The product from the reactor (2) outflow is led to the thickening tank where it is kept under mild stirring for 24 hours, then is mechanically dehydrated by centrifuge or filter press, sized to 250-2500 µm and dried at 110° C. The resulting material has a $Fe_{0.75}Mn_{0.25}OOH$ structure and the manganese valence is 4. Its application to an adsorption column with contact time of 3 minutes gives an adsorption capacity of $Hg^{2+}$ 2.8 µg/mg in standard NSF water, pH 7 and an equilibrium concentration of 1 µg/L.

Example of Method Application 3

A solution of 30 g/L $FeSO_4 \cdot H_2O$ is fed at a flowrate of $Q_1=4$ m³/h and mixed with a 20 g/L $KMnO_4$ solution of flowrate $Q_2=2$ m³/h in the 2 m³ volume stirred-reactor (1). The flowrate of $KMnO_4$ is varied so that the redox potential in the reactor (1) is maintained in the 500±50 mV range. The pH of the reaction is adjusted to 5.5±0.1 by the addition of 30% w/w NaOH solution.

The reaction product leaving the reactor (1) enters the 24 m³ volume stirred-reactor (2), where a solution of 30 g/L $FeSO_4 \cdot H_2O$ at a flowrate of $Q_3=4$ m³/h and a solution of 20 g/L $KMnO_4$ at a flowrate of $Q_4=2$ m³/h are added. The redox potential in the reactor (2) is regulated in the 650±50 mV range by the addition of $KMnO_4$ and the pH is regulated at 9±0.1 by the addition of a 30% w/w NaOH solution. The product from the reactor (2) outflow is led to the thickening tank where it is kept under stirring for 24 hours, then is mechanically dehydrated by centrifuge or filter press, sized to less than 50 µm and dried at 110° C. The resulting material has a $Fe_{0.75}Mn_{0.25}OOH$ structure and the manganese valence is 4. Its application to an adsorption column with contact time of 0.01 sec gives an adsorption capacity of $Hg^{2+}$ 13.3 µg/mg for an equilibrium concentration of 50 µg/m³ from a nitrogen gas stream of 120° C.

Example of method Application 4

A 36 g/L $FeCl_2$ solution is fed at a flowrate of $Q_1=12$ m³/h and mixed with a 15 g/L $KMnO_4$ solution with a flowrate of $Q_2=4$ m³/h in the 5 m³ volume stirred-reactor (1). The flowrate of $KMnO_4$ is varied so that the redox potential in the reactor (1) is maintained in the 500±50 mV range.

The reaction product leaving the reactor (1) enters the 16 m³ volume stirred-reactor reactor (2), where a solution of 45 g/L $FeSO_4 \cdot H_2O$ at a flowrate of $Q_3=6$ m³/h and a solution of 15 g/L $KMnO_4$ at a flowrate of $Q_4=2$ m³/h are added. The redox potential in the reactor (2) is regulated in the 650±50 mV range by the addition of $KMnO_4$ and the pH is regulated at 9±0.1 by the addition of a 30% w/w NaOH solution. The product from the reactor (2) outflow is led to the thickening tank where it is kept under stirring for 24 hours, then is mechanically dehydrated with a centrifuge or filter press, dried at 110° C. and sized to less than 50 µm. The resulting material has a $Fe_{0.75}Mn_{0.25}OOH$ structure and the manganese valence is 4. Its application by injection into a gaseous nitrogen stream containing $Hg^0$ up to 400 µg/m³ resulted in the decrease in its concentration below the emission limit of 50 µg/m³.

Example of Method Application 5

The procedure of Example 3 is followed except that there is no further addition of reactants in the reactor (2). The resulting material has a $Fe_{0.75}Mn_{0.25}OOH$ structure and the manganese valence is 4. Its' application to an adsorption column with contact time of 0.01 seconds gives an adsorption capacity of 10.6 µg/mg for elemental mercury $Hg^0$ for an equilibrium concentration of 50 µg/m³ from a nitrogen gas stream of 120° C.

The method described in this invention is performed either on laboratory or industrial scale depending on the production capacity of the continuous flow reactor.

The product produced based on the synthesis method of the invention can be used to capture mercury and other heavy metals such as cadmium, lead, nickel, cobalt, vanadium, copper, manganese and iron from aqueous solution or elemental mercury from a gaseous stream, preferably in an adsorption bed or as powder in an spraying system.

The invention claimed is:

1. A method for preparing tetravalent manganese feroxyhyte ($\delta$-$Fe_{(1-x)}Mn_xOOH$, x=0.05-0.25), wherein the method is conducted in two continuous flow stirred-tank reactors arranged in serial configuration, where a first reactor has weakly acidic conditions and wherein a second reactor has weakly alkaline conditions and high redox potential for the production of a material having a high negative charge surface density, the method further comprising the following steps:
   i) $FeSO_4$ or $FeCl_2$ is added to the first reactor as an iron source at a concentration of 1-50 g/L and $KMnO_4$ is added as a source of manganese at a concentration of 1-20 g/L to perform a reaction for nuclei production of the $\delta$-$Fe_{(1-x)}Mn_xOOH$, wherein a pH value of the first reactor is adjusted to a weakly acidic region of (pH between 5-6) by adding one or a combination of more than one of the reagents NaOH, $NaHCO_3$, $Na_2CO_3$, KOH, $KHCO_3$, $K_2CO_3$, while at the same time a value of the redox potential in the first reactor is adjusted to a range of 450-550 mV with an appropriate adjustment of $FeSO_4$ or $FeCl_2$ and $KMnO_4$ flowrates, then
   ii) a reaction of negatively charged surface nanocrystals growth proceeds to the second reactor by further addition of $FeSO_4$ or $FeCl_2$ and $KMnO_4$ reagents with a pH value in the second reactor adjusted to an alkaline region (pH between 9-10) by adding one or a combination of more than one of the reagents NaOH, KOH and at the same time a value of the redox potential in the second reactor is adjusted to a range of 600-700 mV, with the appropriate adjustment of the $FeSO_4$ or $FeCl_2$ and $KMnO_4$ flowrates comprises:
   iii) a residence-reaction time of maximum 20 minutes in the first reactor and at least 2 hours in the second reactor; and
   iv) a product exiting the second reactor enters a thickening tank, where with mild stirring for a period of 6-36 hours, grains are formed in an irregular shape, having a specific surface area of 100 m²/g to 300 m²/g, high negative surface charge (>1.5 mmol H⁺/g) and isoelectric point less of than 5.5.

2. The method according to claim 1, wherein the pH of the reaction in the second reactor is 9 and the redox potential is 650 mV.

3. The method according to claim 1, wherein the produced material undergoes mechanical dehydration, and granulation at a granule size of between 250-2500 µm and drying at 100-150° C.

4. The method according to claim 1, wherein material produced after the application of the process is mechanically dehydrated, dried at 100-150° C. and granulated in a granule size of less than 50 µm (5).

5. A single phase adsorbent material of negatively charged tetravalent manganese feroxyhyte ($\delta$-$Fe_{(1-x)}Mn_xOOH$) produced according to the method of claim 1, wherein a percentage of 0.05-25% of iron has been isomorphic substituted by manganese atoms, with a specific surface area of 100-300 m$^2$/g, a negative surface charge density greater than 1.5 mmol H$^+$/g and an isoelectric point of less than 5.5.

6. A single phase adsorbent material of negatively charged tetravalent manganese feroxyhyte ($\delta$-Fe$_{(1-x)}$Mn$_x$OOH) produced according to the method of claim 2, wherein a percentage of 0.05-25% of iron has been isomorphic substituted by manganese atoms, with a specific surface area of 100-300 m$^2$/g, a negative surface charge density greater than 1.5 mmol H$^+$/g and an isoelectric point of less than 5.5.

7. A single phase adsorbent material of negatively charged tetravalent manganese feroxyhyte ($\delta$-Fe$_{(1-x)}$Mn$_x$OOH) produced according to the method of claim 3, wherein a percentage of 0.05-25% of iron has been isomorphic substituted by manganese atoms, with a specific surface area of 100-300 m$^2$/g, a negative surface charge density greater than 1.5 mmol H$^+$/g and an isoelectric point of less than 5.5.

8. A single phase adsorbent material of negatively charged tetravalent manganese feroxyhyte ($\delta$-Fe$_{(1-x)}$Mn$_x$OOH) produced according to the method of claim 4, wherein a percentage of 0.05-25% of iron has been isomorphic substituted by manganese atoms, with a specific surface area of 100-300 m$^2$/g, a negative surface charge density greater than 1.5 mmol H$^+$/g and an isoelectric point of less than 5.5.

\* \* \* \* \*